United States Patent
Multon et al.

[11] Patent Number: 5,621,259
[45] Date of Patent: Apr. 15, 1997

[54] LINEAR MOTOR

[75] Inventors: Bernard F. A. Multon, Fresnes; Jean H. L. Lucidarme, Sainte Genevieve; Laurent P. A. Prévond, Villemomble, all of France

[73] Assignee: Somfy, France

[21] Appl. No.: 440,062

[22] Filed: May 12, 1995

[30] Foreign Application Priority Data

May 20, 1994 [FR] France .................................. 94 06186

[51] Int. Cl.$^6$ ........................... H02K 41/00; B60L 13/00
[52] U.S. Cl. ............................................. 310/12; 104/294
[58] Field of Search ................................ 310/12, 13, 14; 104/200, 294

[56] References Cited

U.S. PATENT DOCUMENTS 3,906,321 9/1975 Salihi ........................................ 318/439

FOREIGN PATENT DOCUMENTS 0161677  5/1985  European Pat. Off. .
2111463  10/1971  France .
2485287  6/1980  France .

*Primary Examiner*—Steven L. Stephan
*Assistant Examiner*—Judson H. Jones
*Attorney, Agent, or Firm*—Laff, Whitesel, Conte & Saret, Ltd.

[57] ABSTRACT

A linear motor comprising, on the one hand, a stator rail (1) and two conducting tracks (C1, C2) connected to the positive and negative poles of a DC current source and, on the other hand, moving gear equipped with at least two coils (B1, B2) powered by means of sliding contacts (CT1 to CT4) moving on the conducting tracks so as to commutate the current in the coils. The rail includes two auxiliary conducting tracks (C3, C4) connected to the positive and negative poles of the DC current source and the moving gear is equipped with auxiliary sliding contacts (CT5 to CT8) in permanent contact with each of the auxiliary conducting tracks and connected to each of the main sliding contacts through a pair of diodes (D1, D8), so as to eliminate electric arcs during the commutation of the current.

1 Claim, 1 Drawing Sheet

LINEAR MOTOR

FIELD OF THE INVENTION

The subject of the present invention is a linear motor comprising, on the one hand, a stator rail exhibiting a succession of active or passive stator poles and at least two conducting tracks connected respectively to the positive and negative poles of a DC current source and interpenetrating one another and, on the other hand, moving gear equipped with at least two coils powered by means of sliding contacts moving along the conducting tracks so as to commutate in the coils the current necessary for the movement of the moving gear along the rail.

PRIOR ART

Such a motor is known from Patent EP 0 161 677. This linear motor consists of a stator rail equipped with alternating magnets and with moving gear including two coils each powered separately by a pair of sliding contacts which are offset transversely to the direction of movement.

Also known are polarized two-phase linear motors in which the rail, made of ferromagnetic material, such as mild steel, is equipped with teeth or cutouts defining stator poles and the moving gear of which consists of an inductor equipped with a permanent magnet and with two or four coils (Traité d'Electricité de l'Ecole Polytechnique Fédérale de Lausanne, vol. IX, p. 260 and 261). These coils are powered by wires, but it would of course also be possible to power them using conducting tracks and sliding contacts.

In such linear motors the commutation of the current in the coils has the effect of creating at the terminals of these coils an induced voltage which causes an electric arc to appear between the sliding contacts and the conducting tracks. The nuisance of such arcs is well-known, both as regards the wearing of the contacts and as regards the creation of electrical fields which interfere with radio frequencies.

SUMMARY OF THE INVENTION

The object of the present invention is to eliminate these electrical arcs.

To this end, the linear motor according to the invention is one wherein the rail includes two auxiliary conducting tracks connected respectively to the positive and negative poles of the DC current source and the moving gear is equipped with at least one pair of auxiliary sliding contacts, respectively in permanent contact with each of the auxiliary conducting tracks, each of these auxiliary sliding contacts being electrically connected to each of the main sliding contacts through a pair of diodes, such that each main sliding contact is connected on the one hand to the anode of a diode whose cathode is connected to the positive auxiliary conducting track and, on the other hand, to the cathode of a diode whose anode is connected to the negative auxiliary conducting track.

Of course the fitting of a diode in parallel with a coil to protect a commutation semiconductor against over-voltage is known, but such means have never been used to eliminate electric arcs in a linear motor.

The extinguishing means according to the invention may be applied equally well to a two-phase motor or to a three-phase motor whose windings are in star or in delta configuration.

BRIEF DESCRIPTION OF THE DRAWINGS

The appended drawing represents, by way of example, two embodiments of the invention.

DESCRIPTION OF THE PREFERRED EMBODIMENT(S)

Figure 1:
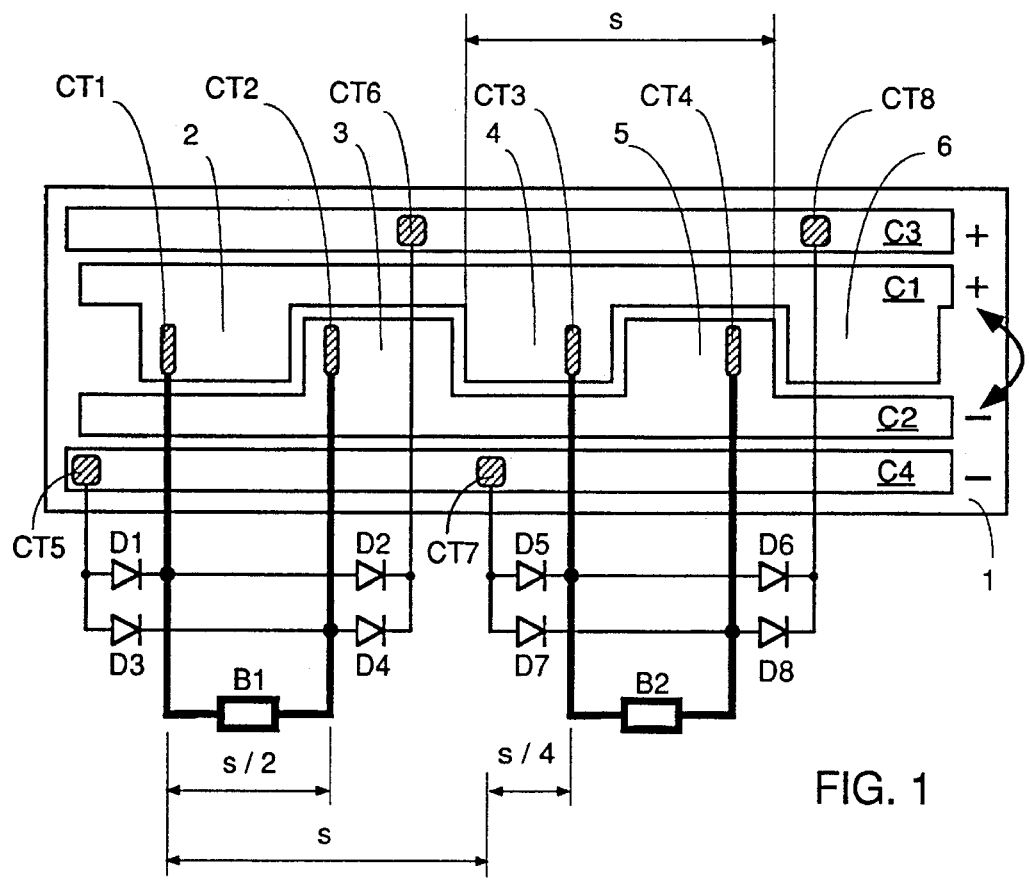
FIG. 1 diagrammatically represents a linear motor comprising two-phase moving gear with two coils powered separately.

The linear motor represented in FIG. 1 comprises an active stator rail 1, that is to say one in which the poles consist of permanent magnets, or a passive stator rail 1, that is to say one made of ferromagnetic material. This rail 1, represented very diagrammatically, is equipped with two conducting tracks C1 and C2 for powering two-phase moving gear represented diagrammatically by its two coils B1 and B2, and two auxiliary conducting tracks C3 and C4, the track C3 being connected to the positive pole of a DC power source and the track C4 being connected to the negative pole of this source.

The main conducting tracks C1, C2 are imbricated in one another via rectangular regions 2, 3, 4, 5, 6, the distance s separating the corresponding sides of two consecutive rectangular regions on each of the conducting tracks corresponding to the stator pitch of the motor. The auxiliary tracks C3 and C4 simply consist of continuous strips. One of the tracks C3 or C4 could consist of the rail itself.

The coil B1 of the moving gear is powered by means of two sliding contacts CT1 and CT2 aligned in the direction of the stator rail 1 and offset by a distance equal to ½ a pitch, that is to say S/2. The coil B2 is powered in the same way by two sliding contacts CT3 and CT4. The two pairs of contacts CT1, CT2 and CT3, CT4 are phase shifted with respect to each other by the value of quarter of a pitch, to within a whole number of pitches, that is to say S/4 so as to ensure the movement of the moving gear for any position thereof. When the moving gear moves, the sliding contacts CT1 to CT4 are alternately in contact with the tracks C1 and C2 in order to commutate the current in the coils B1 and B2 in a known manner. The operation of the motor is similar to that of the motor described in document EP-0 161 677 or in Patent Application FR 92 13236. The description of the operation will therefore not be repeated here.

The moving gear is furthermore equipped with two pairs of auxiliary sliding contacts CT5, CT6 and CT7, CT8. The sliding contacts CT5 and CT7 are in permanent contact with the auxiliary conducting track C4, while the sliding contacts CT6 and CT8 are in permanent contact with the auxiliary track C3. The sliding contacts CT5 and CT6 are connected to the two terminals of the coil B1 through four diodes D1, D2, D3, D4. The anodes of the diodes D1, D3 are connected to the contact CT5 and their cathodes, respectively to each of the terminals of the coil B1. The anodes of the diodes D2 and D4 are respectively connected to each of the terminals of the coil B1 and their cathodes to the contact CT6, that is to say to the positive pole of the power supply. The diodes D1 to D4 are therefore normally non-conducting.

The sliding contacts CT7 and CT8 are connected in the same way to the coil B2 by four diodes D5, D6, D7, D8.

It has been assumed in the figure that the track C1 is connected to the positive pole of the DC current source and that the track C2 is connected to the negative pole of this source, for example by means of a reversing switch. These respective polarities of C1 and C2 may be inverted with the aid of a reversing switch (not represented) so as to allow the carriage to move in the opposite direction. In contrast, polarities of the tracks C3 and C4 remain fixed.

In the represented position of the moving gear, each of the coils B1 and B2 has a current flowing through it which has the effect of causing the moving gear to move to the right, in the direction of the arrow represented.

At a certain moment, the sliding contacts CT1 to CT4 leave the rectangular regions of the conducting tracks over which they were moving and pass very quickly through the space, slightly greater than the width of the contacts, separating two neighboring rectangular regions of the conducting tracks C1 and C2. The voltage induced at this moment in the coils B1 and B2 tends to provoke the formation of an electric arc between the sliding contacts and the conducting track which they are about to reach. This induced voltage does, however, have the effect of biasing the diodes in the conducting direction and allowing the induced current to pass directly from the auxiliary track C4 to the auxiliary track C3. The induced voltage is thus limited to the value of the supply voltage providing the continuity of the magnetic energy, so that there is no time for an electric arc to form between the sliding contacts and the conducting power supply tracks.

Figure 2:
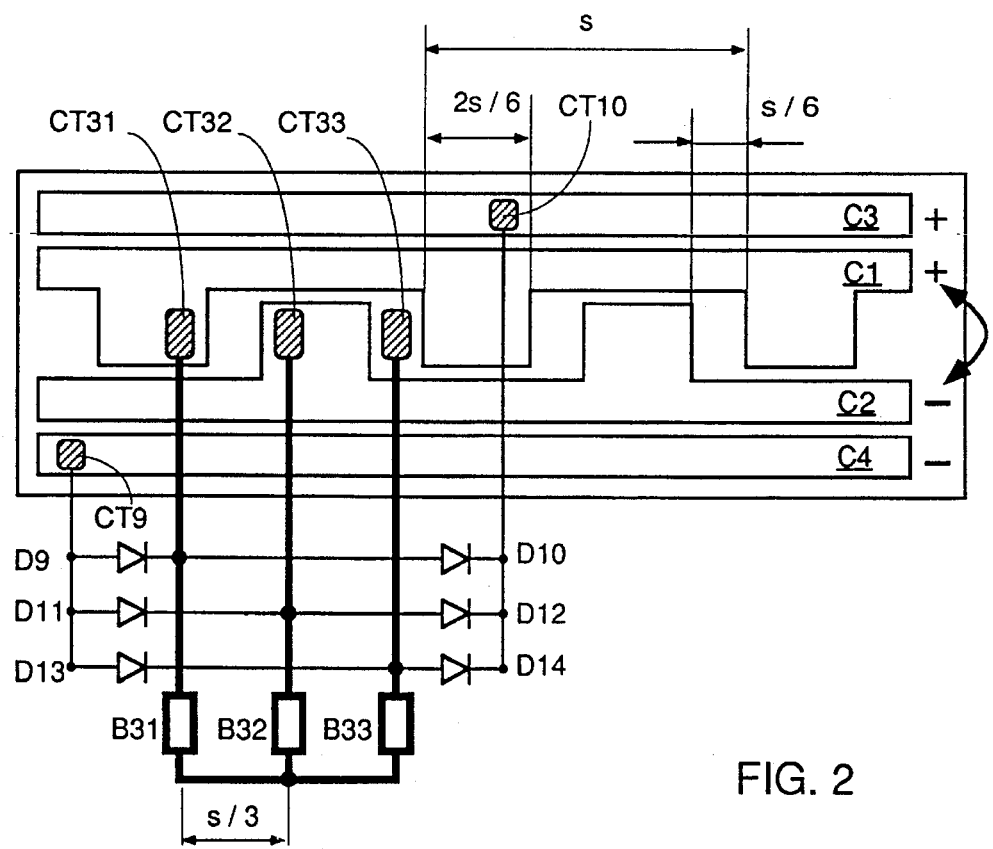
FIG. 2 diagrammatically represents a linear motor with three-phase moving gear.

The electric arc elimination means described hereinabove for two-phase moving gear are equally applicable to three-phase moving gear, for example a star-configured three-phase coil as represented in FIG. 2.

The conducting power supply tracks C1 and C2 of this second embodiment can be distinguished from the conducting tracks of the first embodiment in that the rectangular regions have a width of 2/6 of a stator pitch (2S/6) and are separated by a distance equal to 1/6 of a stator pitch (S/6). The moving gear is equipped with three coils B31, B32, B33 connected in star configuration and with three main sliding contacts CT31, CT32, CT33 aligned in the direction of the rail, that is to say in the direction of the movement of the moving gear and offset from one another by a distance equal to 1/3 of the stator pitch, to within a whole number of stator pitches.

By moving the moving gear, it will be noted that each of the coils has an almost sinusoidal staircase current with seven current levels passing through it, and that the three almost sinusoidal currents through the coils are phase shifted by one third of a period so that they constitute a three-phase current with low ripple.

By connecting the coils of the moving gear in delta configuration, it would be noted that these coils have a three-phase current passing through them consisting of three almost sinusoidal currents having five different levels.

Returning to FIG. 2, the ends of the branches of the star formed by the coils are connected to two auxiliary sliding contacts CT9 and CT10 through three pairs of diodes D9, D10, D11, D12 and D13, D14, the sliding contacts CT9 and CT10 being in permanent contact respectively with the auxiliary track C4 and the auxiliary track C3. As in FIG. 1, the diodes are connected in the non-conducting sense and they have the same effect as in FIG. 1.

We claim:

1. A linear motor comprising, on the one hand, a stator rail (1) exhibiting a succession of active or passive stator poles and at least two conducting tracks (C1, C2) connected respectively to the positive and negative poles of a DC current source and interpenetrating one another and, on the other hand, moving gear equipped with at least two coils (B1, B2; B31, B32, B33) powered by means of sliding contacts (CT1 to CT4; CT31, CT32, CT33) moving along the conducting tracks so as to commutate in the coils the current necessary for the movement of the moving gear along the rail, wherein the rail includes two auxiliary conducting tracks (C3, C4) connected respectively to the positive and negative poles of the DC current source and the moving gear is equipped with at least one pair of auxiliary sliding contacts (CT5, CT6, CT7, CT8; CT9, CT10) respectively in permanent contact with each of the auxiliary conducting tracks, each of these auxiliary sliding contacts being electrically connected to each of the main sliding contacts through a pair of diodes (D1 to D8; D9 to D14), such that each main sliding contact is connected on the one hand to the anode of a diode whose cathode is connected to the positive auxiliary conducting track (C3) and, on the other hand, to the cathode of a diode whose anode is connected to the negative auxiliary conducting track (C4).

* * * * *